US007411605B2

(12) United States Patent
Kim

(10) Patent No.: US 7,411,605 B2
(45) Date of Patent: Aug. 12, 2008

(54) APPARATUS FOR PREVENTING IMAGE STICKING OF VIDEO DISPLAY APPLIANCE AND METHOD THEREOF

(75) Inventor: Kyung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 595 days.

(21) Appl. No.: 11/023,627

(22) Filed: Dec. 29, 2004

(65) Prior Publication Data

US 2005/0140827 A1 Jun. 30, 2005

(30) Foreign Application Priority Data

Dec. 30, 2003 (KR) ..................... 10-2003-0099780

(51) Int. Cl.
*H04N 3/20* (2006.01)
*H04N 5/04* (2006.01)

(52) U.S. Cl. ...................................... 348/173; 348/511

(58) Field of Classification Search ................. 348/173, 348/561, 556, 558, 565, 581, 583, 511; 345/698; 715/567

See application file for complete search history.

(56) References Cited

U.S. PATENT DOCUMENTS 4,677,430 A * 6/1987 Falkman et al. ............. 345/682
6,747,671 B1 * 6/2004 Saito .......................... 345/698
2004/0114040 A1 * 6/2004 Bellwood et al. ........... 348/173

* cited by examiner

*Primary Examiner*—M. Lee
(74) *Attorney, Agent, or Firm*—Ked & Associates, LLP

(57) ABSTRACT

Disclosed is an apparatus for preventing image sticking of a video display appliance and method thereof that can effectively remove a black display region appearing on a border part of a display screen of the video display appliance when an image sticking function is performed. The apparatus includes a control unit for outputting a control signal for zooming an input video signal at a predetermined zooming rate and performing the image-sticking prevention function if an image-sticking prevention mode is set, and a video processing unit for zooming the video signal at the predetermined zooming rate and processing the zoomed video signal to display the zoomed video signal on a display screen according to the control signal from the control unit. By zooming the video signal at the predetermined zooming rate and then by repeatedly performing a slight movement of the zoomed video signal being displayed on the display screen left/right/upward/downward, the black display region can be removed from the display screen.

25 Claims, 2 Drawing Sheets

APPARATUS FOR PREVENTING IMAGE STICKING OF VIDEO DISPLAY APPLIANCE AND METHOD THEREOF

BACKGROUND OF THE INVENTION

1. Field of the Invention

The present invention relates generally to a video display appliance, and more particularly to an apparatus for preventing image sticking of a video display appliance and a method thereof that can effectively prevent or remove the image sticking occurring during the display of an image on the video display appliance.

2. Description of the Related Art

A television receiver (TV), which is a kind of video display appliance, selects a broadcasting signal of a channel selected by a user among broadcasting signals transmitted from broadcasting stations, demodulates the selected channel broadcasting signal, and separates the demodulated broadcasting signal into video and audio signals. Then, the TV processes the video and audio signals, and outputs the video and audio signals through a display screen and a speaker, respectively.

Generally, TVs are classified into CRT (Cathode Ray Tube) TVs that have most widely been used, LCD (Liquid Crystal Display) TVs, PDP (Plasma Display Panel) TVs, etc., that have the characteristics of a high picture quality and large scale screen.

In particular, the PDP TV has a fairly small thickness in comparison to the existing CRT TV according to its structural characteristic, and has a superior luminance characteristic in comparison to the LCD TV. Additionally, the PDP TV has an excellent layout characteristic such as wall mounting, and thus has been spotlighted as the next-generation TV.

However, in the case of the LCD TV, if a specified still image is displayed on the display screen for a long time or if an image the aspect ratio of which has been converted from 16:9 to 4:3 is displayed on the display screen for a long time, a residual image, i.e., image sticking, remains on a boundary part of the screen for a considerable time. Meanwhile, in the case of the PDP TV, the cell deterioration occurs, and this may cause the TV to suffer fatal damage.

In most video display appliances, voltage inversion is provided by lines or by pixels, and this causes the voltage inversion to be separately provided by fields. In this case, some voltage difference is actually produced among common voltages, and this voltage difference and the external environments cause the image sticking and the deterioration of pixels to occur. Additionally, if a still image is displayed on the display screen for a long time, the image sticking or the pixel deterioration may occur.

In order to properly cope with the above-described phenomenon, as illustrated in FIG. 1, a method of slightly moving the whole image displayed on the screen for a predetermined period to an extent that the user cannot recognize such movement has been proposed and used. According to his method, the movement of the image may repeatedly be performed in the order of left→downward→right→upward to make a circle or in the order of left→right only.

According to the conventional image sticking prevention method, however, the image displayed on the large scale screen repeatedly moves in the order of left, downward, right and upward, a black display region having a width of about one centimeter and corresponding to a non-signal section appears on the right, upper, left or lower border part of the screen in order, and this causes the user inconvenience in viewing the TV.

SUMMARY OF THE INVENTION

The present invention is directed to an apparatus for preventing image sticking of a video display appliance and a method thereof that substantially obviate one or more problems due to limitations and disadvantages of the related art.

It is an object of the present invention to provide an apparatus for preventing image sticking of a video display appliance and a method thereof that can effectively remove a black display region appearing on a border part of a display screen of the video display appliance when an image sticking unction is performed.

To achieve this object and other advantages in accordance with the purpose of the present invention, as embodied and broadly described herein, there is provided an apparatus for preventing image sticking of a video display appliance having an image-sticking prevention function, comprising a control unit for outputting a control signal for zooming an input video signal at a predetermined zooming rate and performing the image-sticking prevention function if an image-sticking prevention mode is set, and a video processing unit for zooming the video signal at the predetermined zooming rate and processing the zoomed video signal to display the zoomed video signal on a display screen according to the control signal from the control unit.

Preferably, the predetermined zooming rate is a zooming rate at which the original video signal is zoomed so that the black display region appearing on the display screen in the image-shaking prevention mode is removed from the display screen.

Preferably, the predetermined zooming rate is set so that the original video signal is zoomed by 1~2% when the image sticking function is performed.

Preferably, the image-sticking prevention function performed by the control unit includes a function of repeatedly performing a slight movement of the zoomed video signal being displayed on the display screen in specified directions.

Preferably, the specified directions are left/right, up/down, or left/right/up/down.

Preferably, the display screen includes a PDP module or an LCD module.

In another aspect of the present invention, there is provided an apparatus for preventing image sticking of a video display appliance having a display module, comprising a key input unit for inputting a user's command, a video signal input unit for receiving a video signal, a control unit for outputting a control signal for zooming the video signal input through the video signal input unit at a predetermined zooming rate and performing an image-sticking prevention function if an image-sticking prevention mode is selected through the key input unit, and a video processing unit for zooming the video signal input from the video signal input unit at the predetermined zooming rate and processing the zoomed video signal so that the zoomed video signal can be displayed on the display module according to the control signal from the control unit.

Preferably, the predetermined zooming rate is a zooming rate at which the original video signal is zoomed so that a black display region appearing on the display screen in the image-shaking prevention mode is removed from the display screen.

Preferably, the predetermined zooming rate is set so that the original video signal is zoomed by 1~2% when the image sticking function is performed.

Preferably, the image-sticking prevention function performed by the control unit includes a function of repeatedly performing a slight movement of the zoomed video signal being displayed on the display screen in specified directions.

Preferably, the specified directions are left/right, up/down, or left/right/up/down.

Preferably, the display module is a PDP module or an LCD module.

In still another aspect of the present invention, there is provided a method for preventing image sticking of a video display appliance having a display module, the method comprising the steps of if a user inputs a 'power-on' command, displaying a received video signal on a display screen and judging whether an image-sticking function is turned on, and if the image-sticking function is turned on, zooming the video signal being displayed on the display screen at a predetermined zooming rate and performing an image-sticking prevention function.

Preferably, the predetermined zooming rate is a zooming rate at which the original video signal is zoomed so that a black display region appearing on the display screen in the image-shaking prevention mode is removed from the display screen.

Preferably, the predetermined zooming rate is set so that the original video signal is zoomed by 1~2% when the image sticking function is performed.

Preferably, the image-sticking prevention function includes a function of repeatedly performing a slight movement of the zoomed video signal being displayed on the display screen in specified directions.

Preferably, the specified directions are left/right, up/down, or left/right/up/down.

Preferably, the display screen includes a PDP module or an LCD module.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Wherever possible, the same reference numbers will be used throughout the drawings to refer to the same or similar parts.

Figure 1:
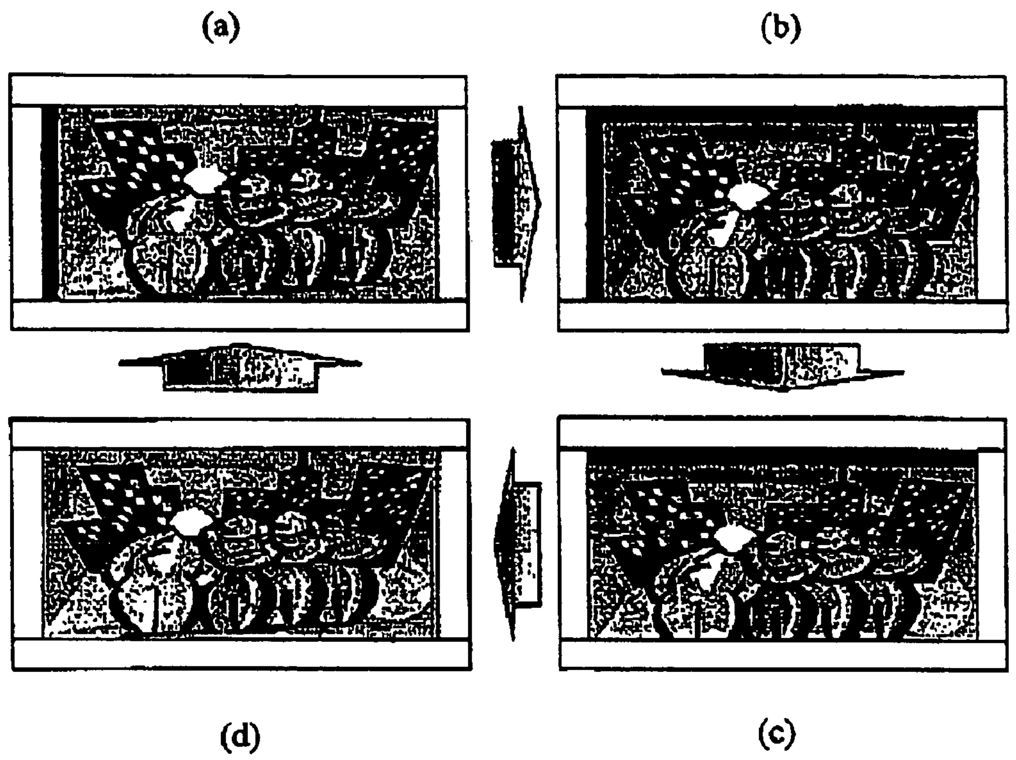
FIG. 1 is a view explaining the conventional method for preventing image sticking of a video display appliance.
Figure 2:
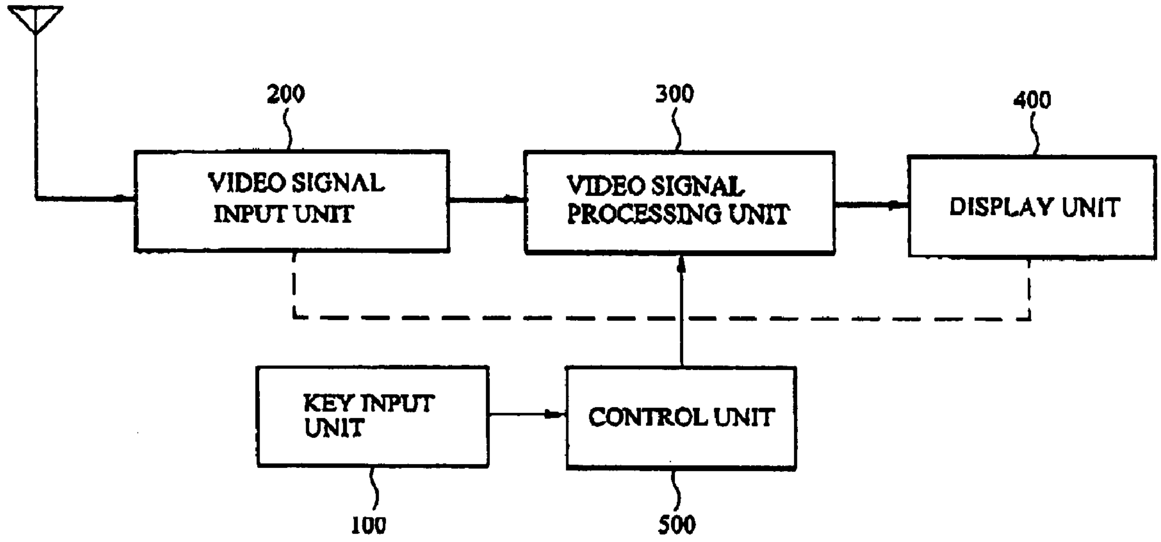
FIG. 2 is a block diagram illustrating the construction of an apparatus for preventing image sticking of a video display appliance according to the present invention.
Figure 3:
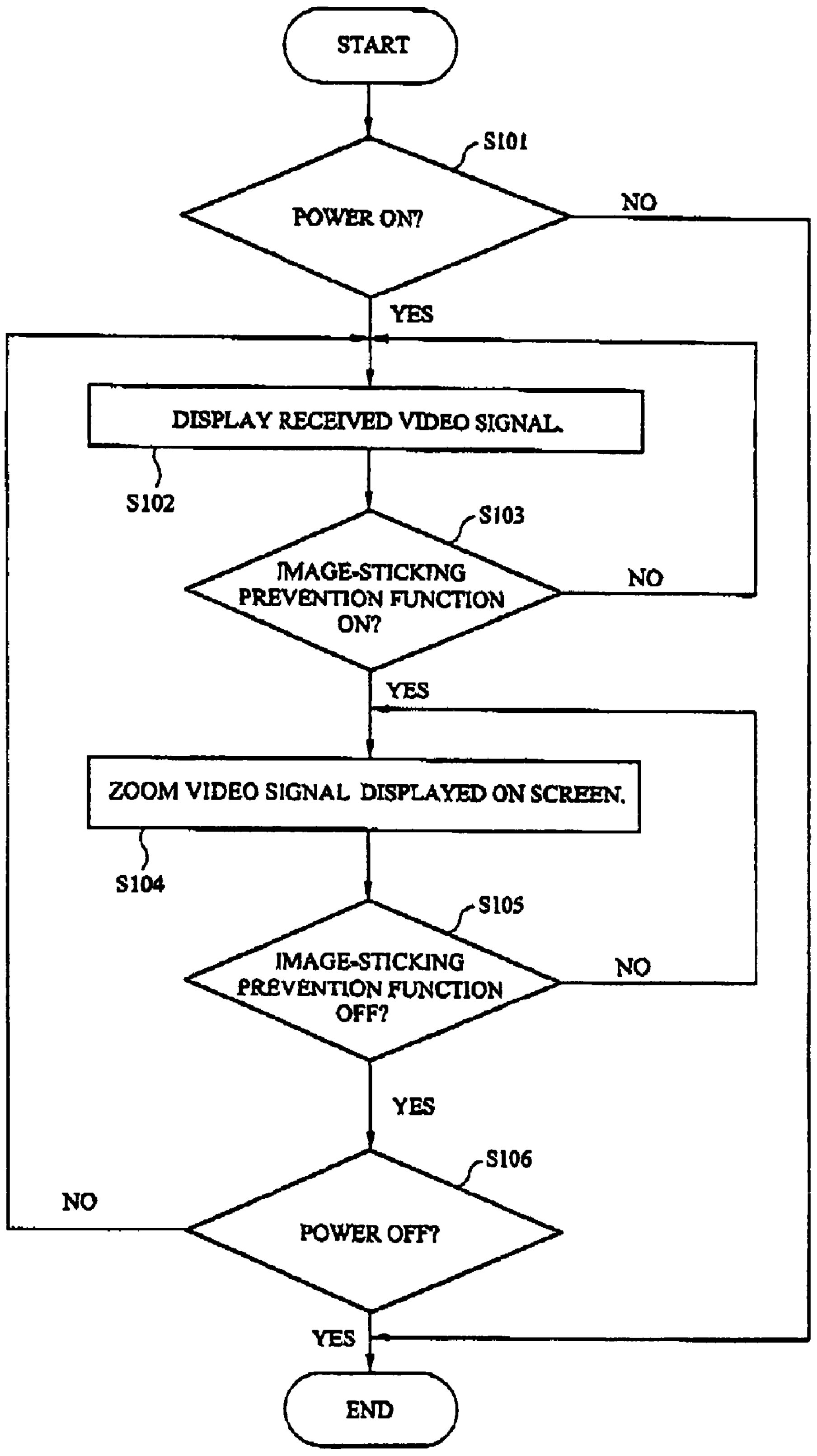
FIG. 3 is a flowchart illustrating a method for preventing image sticking of a video display appliance according to the present invention.

FIG. 2 is a block diagram illustrating the construction of an apparatus for preventing image sticking of a video display appliance according to the present invention, and FIG. 3 is a flowchart illustrating a method for preventing image sticking of a video display appliance according to the present invention.

The apparatus for preventing image sticking of a video display appliance according to the present invention, as illustrated in FIG. 2, includes a key input unit 100 for inputting a user's command, a video signal input unit 200 for receiving a video signal, a control unit 500 for outputting a control signal for zooming the video signal input through the video signal input unit 200 at a predetermined zooming rate and then performing an image sticking prevention function if an image-sticking prevention mode is selected through the key input unit 100, a video processing unit 300 for zooming the video signal input from the video signal input unit 200 at the predetermined zooming rate and processing the zoomed video signal to produce a displayable video signal, and a display unit 400 for displaying the zoomed video signal processed through the video signal processing unit 300.

In the embodiment of the present invention, the display unit includes a PDP module or an LCD module.

According to the apparatus for preventing image sticking of a video display appliance as constructed above according to the present invention, if a user inputs a 'power-on' command through the key input unit 100, the video signal input through the video signal input unit 200 is processed through the video signal processing unit 300, and then displayed on the display unit 400.

In the case that the display unit 400 comprises a PDP module, however, an image-sticking phenomenon may occur, and thus the user may turn on the image-sticking prevention function to prevent the image-sticking phenomenon. One of methods for preventing the image sticking, which is called an orbit function, is to move an image displayed on the display screen in specified directions to an extent that the user cannot recognize such movement.

Accordingly, if the user turns on the image-sticking prevention function, the video signal input through the video signal input unit 200 is zoomed at the predetermined zooming rate when the video signal is processed through the video signal processing unit 300.

Accordingly, even if the orbit function is performed, the black display region appearing on the display unit is covered by the zoomed video signal being displayed on the display unit 400, and thus the black display region removed from the display unit to cause the user convenience in viewing the TV.

Now, the method for preventing the image sticking of the video display appliance according to the present invention will be explained with reference to FIG. 3.

If the user inputs a power-on command, the received video signal is displayed (steps S101 to S102).

Then, it is judged whether the user turns on the image-sticking prevention function (step S103).

If the user has turned on the image-sticking prevention function as a result of judgment at step S103, the video signal is zoomed at the predetermined zooming rate and then the orbit function is performed (step S104).

Thereafter, if the user turns off the image-sticking function and inputs a power-off command, the operation of the video display appliance is terminated, while if the power-off command, is not inputted, the proceeding step returns to the step S102 (steps S105 to S106).

According to the apparatus for preventing the image sticking of a video display appliance and the method thereof according to the present invention, the video signal is zoomed by 1~2% and then displayed on the display unit, so that the black display region can be removed from the display screen when the image-sticking prevention unction is performed.

Accordingly, the apparatus for preventing the image sticking of a video display appliance and the method thereof according to the present invention have the following effects.

By zooming the video signal at the predetermined zooming rate and then by repeatedly performing a slight movement of the zoomed video signal being displayed on the display screen left/right/upward/downward, the black display region can be removed. Because the black display region is removed from the display screen, the user can feel convenience in viewing the TV and the reliability of the product can be improved.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for preventing image sticking of a video display appliance having an image-sticking prevention function, comprising:

a control unit for outputting a control signal for zooming an input video signal at a predetermined zooming rate and performing the image-sticking prevention function if an image-sticking prevention mode is set; and a video processing unit for zooming the video signal at the predetermined zooming rate and processing the zoomed video signal to display the zoomed video signal on a display screen while the image-sticking prevention function is performed according to the control signal from the control unit.

2. The apparatus as claimed in claim 1, wherein the predetermined zooming rate is a zooming rate at which the original video signal is zoomed so that the black display region appearing on the display screen in the image-shaking prevention mode is removed from the display screen.

3. The apparatus as claimed in claim 1, wherein the predetermined zooming rate is set so that the original video signal is zoomed by 1~2% when the image sticking function is performed.

4. The apparatus as claimed in claim 1, wherein the image-sticking prevention function performed by the control unit includes a function of repeatedly performing a slight movement of the zoomed video signal being displayed on the display screen in specified directions.

5. The apparatus as claimed in claim 4, wherein the specified directions are left/right, up/down, or left/right/up/down.

6. The apparatus as claimed in claim 1, wherein the display screen includes a PDP module or an LCD module.

7. An apparatus for preventing image sticking of a video display appliance having a display module, comprising:

a key input unit for inputting a user's command;

a video signal input unit for receiving a video signal;

a control unit for outputting a control signal for zooming the video signal input through the video signal input unit at a predetermined zooming rate and performing an image-sticking prevention function if an image-sticking prevention mode is selected through the key input unit; and a video processing unit for zooming the video signal input from the video signal input unit at the predetermined zooming rate and processing the zoomed video signal so that the zoomed video signal can be displayed on the display module while the image-sticking prevention function is performed according to the control signal from the control unit.

8. The apparatus as claimed in claim 7, wherein the predetermined zooming rate is a zooming rate at which the original video signal is zoomed so that the black display region appearing on the display screen in the image-shaking prevention mode is removed from the display screen.

9. The apparatus as claimed in claim 7, wherein the predetermined zooming rate is set so that the original video signal is zoomed by 1~2% when the image sticking function is performed.

10. The apparatus as claimed in claim 7, wherein the image-sticking prevention function performed by the control unit includes a function of repeatedly performing a slight movement of the zoomed video signal being displayed on the display screen in specified directions.

11. The apparatus as claimed in claim 10, wherein the specified directions are left/right, up/down, or left/right/up/down.

12. The apparatus as claimed in claim 7, wherein the display module includes a PDP module or an LCD module.

13. A method for preventing image sticking of a video display appliance having a display module, the method comprising:

if a user inputs a 'power-on' command, displaying a received video signal on a display screen and judging whether an image-sticking function is turned on; and if the image-sticking function is turned on, zooming the video signal being displayed on the display screen at a predetermined zooming rate and performing an image-sticking prevention function.

14. The method as claimed in claim 13, wherein the predetermined zooming rate is a zooming rate at which the original video signal is zoomed so that the black display region appearing on the display screen in the image-shaking prevention mode is removed from the display screen.

15. The method as claimed in claim 13, wherein the predetermined zooming rate is set so that the original video signal is zoomed by 1~2% when the image sticking function is performed.

16. The method as claimed in claim 13, wherein performing the image-sticking prevention function includes repeatedly performing a slight movement of the zoomed video signal being displayed on the display screen in specified directions.

17. The method as claimed in claim 16, wherein the specified directions are left/right, up/down, or left/right/up/down.

18. The method as claimed in claim 13, wherein the display module includes a PDP module or an LCD module.

19. The apparatus as claimed in claim 1, wherein setting the image-sticking prevention mode and zooming the video signal does not change an aspect ratio mode of the video display apparatus.

20. The apparatus as claimed in claim 1, wherein the video processing unit zooms the video signal while the image-sticking prevention function is performed independent of the aspect screen mode set for the video display apparatus.

21. The apparatus as claimed in claim 1, wherein the video display appliance is set to the image-sticking prevention mode and the video signal is zoomed in response to a user selection signal.

22. The apparatus as claimed in claim 21, wherein the user selection signal does not change an aspect ratio mode of the video display appliance.

23. The apparatus as claimed in claim 1, wherein the video processing unit zooms the video signal at a predetermined two-dimensional zooming rate.

24. The apparatus as claimed in claim 23, wherein the two-dimensional zoom rate lies in a predetermined range relative to a non-zoomed screen size.

25. The apparatus as claimed in claim 24, wherein said predetermined range is 1 to 2% of the non-zoomed screen size.

* * * * *